United States Patent
Onodera

(10) Patent No.: US 10,118,600 B2
(45) Date of Patent: Nov. 6, 2018

(54) VEHICLE BRAKE HYDRAULIC PRESSURE CONTROL APPARATUS

(71) Applicant: AUTOLIV NISSIN BRAKE SYSTEMS JAPAN CO., LTD., Ueda, Nagano (JP)

(72) Inventor: Yosuke Onodera, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 15/469,877

(22) Filed: Mar. 27, 2017

(65) Prior Publication Data
US 2017/0274882 A1    Sep. 28, 2017

(30) Foreign Application Priority Data
Mar. 28, 2016   (JP) ................. 2016-063901

(51) Int. Cl.
*B60T 13/66*    (2006.01)
*B60T 8/36*     (2006.01)
(Continued)

(52) U.S. Cl.
CPC .......... *B60T 13/662* (2013.01); *B60T 8/36* (2013.01); *B60T 8/4059* (2013.01); *B60T 13/66* (2013.01); *B60T 13/686* (2013.01)

(58) Field of Classification Search
CPC ...... B60T 13/662; B60T 13/66; B60T 13/686; B60T 8/36; B60T 8/4059
See application file for complete search history.

(56) References Cited

U.S. PATENT DOCUMENTS 6,807,848 B1 * 10/2004 Fennel ............. B60T 8/368
                                                      303/1
6,901,789 B1 *  6/2005 Fennel ............. B60T 8/368
                                                      701/70
(Continued)

FOREIGN PATENT DOCUMENTS

EP        0313292       4/1989
JP        H04303041    10/1992

OTHER PUBLICATIONS

European Search Report for EP Application No. 17163272.2-1762 dated Jul. 21, 2017, 9 pages.

*Primary Examiner* — Vishal R Sahni
(74) *Attorney, Agent, or Firm* — Andrew M. Calderon; Roberts Mlotkowski Safran Cole & Calderon, P.C.

(57) ABSTRACT

One embodiment provides a vehicle brake hydraulic pressure control apparatus. The apparatus includes an inlet valve; an outlet valve; a pump; a motor and a control unit. The control unit executes an antilock brake control and a control to return a brake fluid accumulated in a reservoir due to a pressure decreasing control in the antilock brake control to a hydraulic pressure source by driving the motor. The control unit includes: a target delivery amount calculator configured to calculate a target delivery amount which corresponds to an amount of brake fluid discharged from the reservoir per a predetermined time; a temperature information fetcher configured to acquire a temperature of the brake fluid; and a drive signal determinator configured to determine a drive signal of the motor based on the target delivery amount and the temperature of the brake fluid.

15 Claims, 9 Drawing Sheets

(51) Int. Cl.
*B60T 8/40* (2006.01)
*B60T 13/68* (2006.01)

(56) References Cited

U.S. PATENT DOCUMENTS

| | | | |
|---|---|---|---|
| 2002/0008426 A1* | 1/2002 | Isono | B60T 8/367 |
| | | | 303/115.4 |
| 2006/0175895 A1 | 8/2006 | Mahlo et al. | |
| 2013/0026817 A1* | 1/2013 | Morishita | B60T 1/10 |
| | | | 303/3 |
| 2015/0298668 A1* | 10/2015 | Kurz | B60T 7/042 |
| | | | 303/10 |

* cited by examiner

VEHICLE BRAKE HYDRAULIC PRESSURE CONTROL APPARATUS

CROSS-REFERENCE TO RELATED APPLICATION(S)

This application claims priority from Japanese Patent Application No. 2016-063901 filed on Mar. 28, 2016, the entire contents of which are incorporated herein by reference.

FIELD

The present invention relates to a vehicle brake hydraulic pressure control apparatus.

BACKGROUND

There is known a brake system, as a vehicle brake system, in which a pump is provided on piping through which a brake fluid flows, and the pump is driven by supplying electric power to an electric motor of the pump so as to cause the brake fluid to flow in a predetermined direction in the piping. The viscosity of the brake fluid increases as the temperature of the brake fluid decreases, and this makes it difficult for the brake fluid to flow smoothly in the piping. To deal with this drawback, for example, JP-H04-303041-A discloses a vehicle braking control unit in which in the event that a temperature of a brake fluid detected by a temperature sensor is equal to or lower than a preset temperature, electric power that is supplied to a driving motor of a pump is increased so as to increase the driving torque of the pump.

Incidentally, in the prior art technique, the electric power that is supplied to the driving motor is increased in the event that the temperature of the brake fluid is equal to or lower than the preset temperature. However, there is described nothing concerning the extent to which the electric power to be supplied is increased. Due to this, in the prior art technique, there are fears that electric power is consumed more than required in the event that the temperature of the brake fluid is slightly lower than the preset temperature. In addition, in the event that the temperature of the brake fluid is much lower than the preset temperature, the delivery pressure of the pump becomes insufficient, leading to fears that the brake fluid does not flow smoothly.

SUMMARY

One object of the invention is to provide a vehicle brake hydraulic pressure control apparatus which can not only suppress the consumption of electric power but also allow a brake fluid to flow smoothly.

An aspect of the present invention provides a vehicle brake hydraulic pressure control apparatus including:
an inlet valve interposed on a hydraulic line extending from a hydraulic pressure source to a wheel brake;
an outlet valve interposed on a hydraulic line extending from the wheel brake to a reservoir;
a pump interposed on a hydraulic line extending from the reservoir to the hydraulic pressure source;
a motor configured to drive the pump; and
a control unit configured to execute an antilock brake control, and to execute a control to return a brake fluid accumulated in the reservoir due to a pressure decreasing control in the antilock brake control to the hydraulic pressure source by driving the motor,
wherein the control unit includes:
a target delivery amount calculator configured to calculate a target delivery amount which corresponds to an amount of brake fluid discharged from the reservoir per a predetermined time;
a temperature information fetcher configured to acquire a temperature of the brake fluid; and
a drive signal determinator configured to determine a drive signal of the motor based on the target delivery amount and the temperature of the brake fluid.

According to the configuration described above, since the drive signal can be determined suitably in proportion to the target delivery amount and the temperature of the brake fluid by determining the drive signal of the motor based on the target delivery amount and the temperature of the brake fluid, not only can the consumption of electric power be suppressed, but also the brake fluid can be caused to flow smoothly.

There may be provided the vehicle brake hydraulic pressure control apparatus,
wherein the drive signal is an indication voltage for driving the motor, and
wherein the drive signal determinator decreases a magnitude of the indication voltage lower as the temperature of the brake fluid becomes higher.

According to the configuration described above, in the event that the temperature of the brake fluid is so high that the brake fluid is allowed to flow easily, the magnitude of the indication voltage can be made small, and therefore, the consumption of electric power can be suppressed. In addition, since the revolution speed of the motor becomes slow, the operation noise of the motor can be made inconspicuous. Additionally, in the event that the temperature of the brake fluid is so low that the brake fluid flows with difficulty, since the magnitude of the indication voltage can be made great, the brake fluid is allowed to flow smoothly.

There may be provided the vehicle brake hydraulic pressure control apparatus,
wherein the drive signal determinator determines the drive signal based on a preset first map which associates the target delivery amount, the temperature of the brake fluid and the drive signal.

According to the configuration described above, the drive signal can be determined easily without performing a calculation by determining the drive signal based on the first map which is preset.

There may be provided the vehicle brake hydraulic pressure control apparatus,
wherein the control unit includes:
a reservoir usage amount estimator configured to estimate a reservoir usage amount which corresponds to an increase amount from an initial state of the brake fluid in the reservoir; and
a target discharge time setter configured to set a target discharge time corresponding to a driving time of the motor which is necessary to return the brake fluid accumulated in the reservoir to the hydraulic pressure source based on a road surface friction coefficient, and
wherein the target delivery amount calculator calculates the target delivery amount based on the reservoir usage amount and the target discharge time.

According to the configuration described above, since the target delivery amount based on which the drive signal is determined is calculated based on the amount of brake fluid within the reservoir and the target discharge time set based on the road surface friction coefficient, the motor can be driven at a revolution speed matching the road surface condition. This can make, for example, the operation noise of the motor inconspicuous.

There may be provided the vehicle brake hydraulic pressure control apparatus, wherein the control unit drives the motor during the pressure decreasing control, and includes:

a consumed fluid amount estimator configured to estimate a consumed fluid amount which corresponds to an amount of brake fluid which flows into the reservoir based on a hydraulic pressure at the start of the pressure decreasing control and a hydraulic pressure at the end of the pressure decreasing control; and a delivery mount estimator configured to estimate a delivery amount which corresponds to an amount of brake fluid which is discharged from the reservoir during the pressure decreasing control, and wherein the reservoir usage amount estimator estimates the reservoir usage amount based on the consumed fluid amount, the delivery amount and the previous value of the reservoir usage amount.

According to the configuration described above, since the reservoir usage amount is estimated by using the consumed fluid amount, the delivery amount and the previous value of the reservoir usage amount, for example, when compared with the case where the reservoir usage amount is estimated only from the consumed fluid amount, the reservoir usage amount can be obtained accurately.

There may be provided the vehicle brake hydraulic pressure control apparatus, wherein the target discharge time setter sets so that the target discharge time becomes shorter as the road surface friction coefficient becomes higher.

According to the configuration described above, since the motor can be driven at a faster revolution speed for a short time on a road of a high friction coefficient where the road noise becomes high, the driving time of the motor is shortened, whereby the operation noise of the motor can be made inconspicuous. On the contrary, since the motor can be driven at a slower revolution seed for a long time on a road of a low friction coefficient where the road noise becomes low, the revolution seed of the motor becomes slow, whereby the operation noise of the motor can be made inconspicuous.

There may be provided the vehicle brake hydraulic pressure control apparatus, wherein the target discharge time setter sets the target discharge time based on a preset second map which associates the road surface friction coefficient and the target discharge time.

According to the configuration described above, by setting the target discharge time based on the second map which is preset, the target discharge time can easily be set without performing a calculation.

According to the invention, not only can the consumption of electric power be suppressed, but also the brake fluid is allowed to flow smoothly.

DETAILED DESCRIPTION

Next, an embodiment of the invention will be described in detail by reference to the drawings as required.

Figure 1:
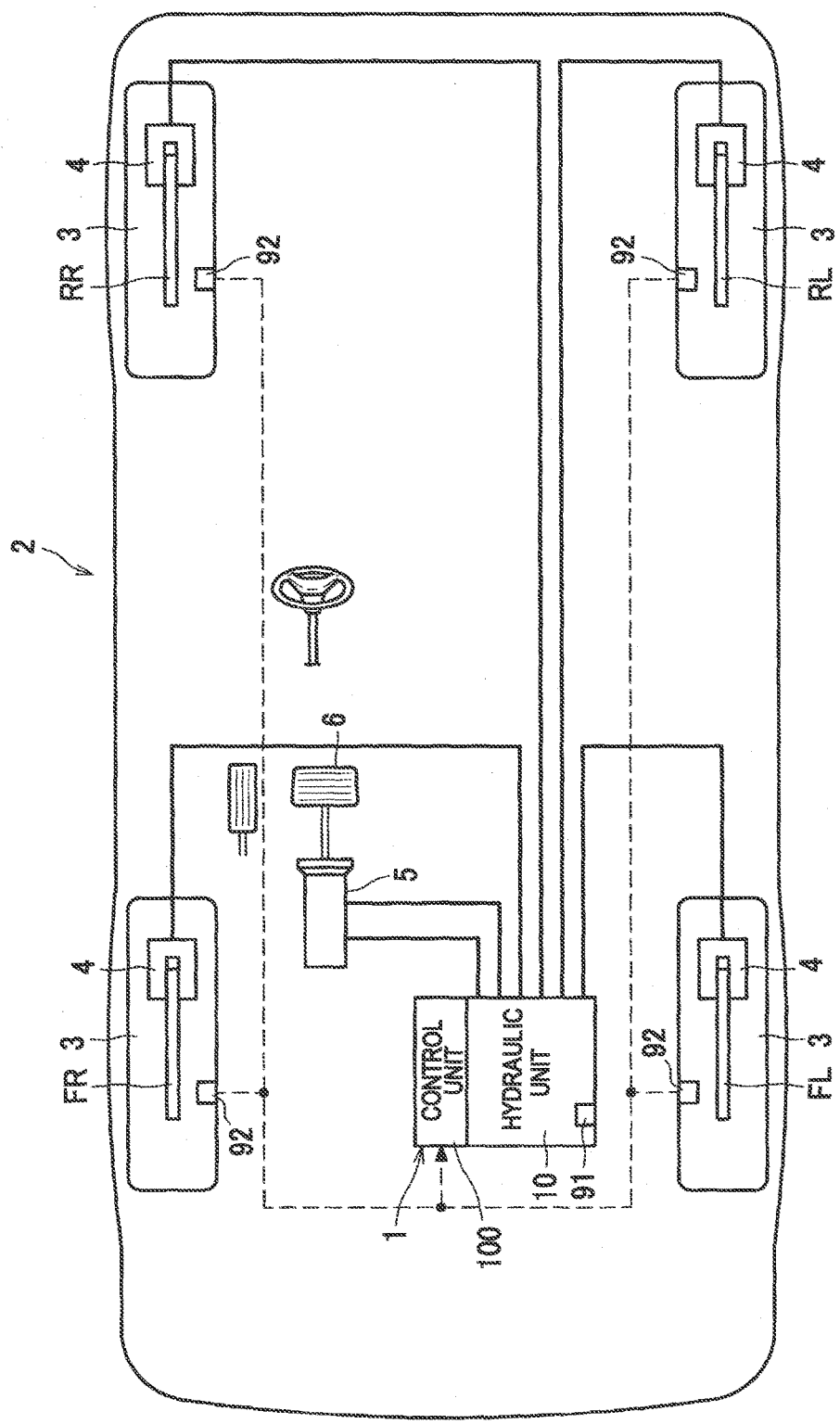
FIG. 1 is a block diagram of a vehicle including a vehicle brake hydraulic pressure control apparatus according to an embodiment.

As shown in FIG. 1, a vehicle brake hydraulic pressure control apparatus 1 is an apparatus for suitably controlling braking force which is applied to wheels 3 of a vehicle 2 which is a four-wheeled vehicle. The vehicle brake hydraulic pressure control apparatus 1 includes mainly a hydraulic unit 10 in which hydraulic lines and various types of parts are provided and a control unit 100 for suitably controlling the various types of parts in the hydraulic unit 10 as required.

Wheel brakes FL, RR, RL, FR are provided individually on the wheels 3, and wheel cylinders 4 are provided individually on the wheel brakes FL, RR, RL, FR. Hydraulic pressures are supplied from a master cylinder 5, which is a source of hydraulic pressure, to the cylinders 4 where braking force is generated. The master cylinder 5 and the wheel cylinders 4 are both connected to the hydraulic unit 10. Then, a brake hydraulic pressure is generated in the master cylinder 5 in proportion to a pedal effort exerted on a brake pedal 6, and the brake hydraulic pressure so generated is controlled in the hydraulic unit 10 by the control unit 100 for supply to the wheel cylinders 4.

Connected to the control unit 100 are a pressure sensor 91 for detecting a hydraulic pressure (a master cylinder pressure Pm) of the master cylinder 5 and wheel speed sensors 92 for detecting wheel speeds Vw of the corresponding wheels 3. The pressure sensor 91 can also detect a temperature Tb of a brake fluid by the use of a known configuration. The control unit 100 includes, for example, a CPU (Central Processing Unit), a RAM (Random Access Memory), a ROM (Read Only Memory) and input and output circuits and controls to increase or decrease hydraulic pressures in the wheel brakes FL, RR, RL, FR by executing various arithmetic operations based on inputs from the pressure sensor 91 and the wheel speed sensors 92, as well as programs and data stored in the ROM.

Figure 2:
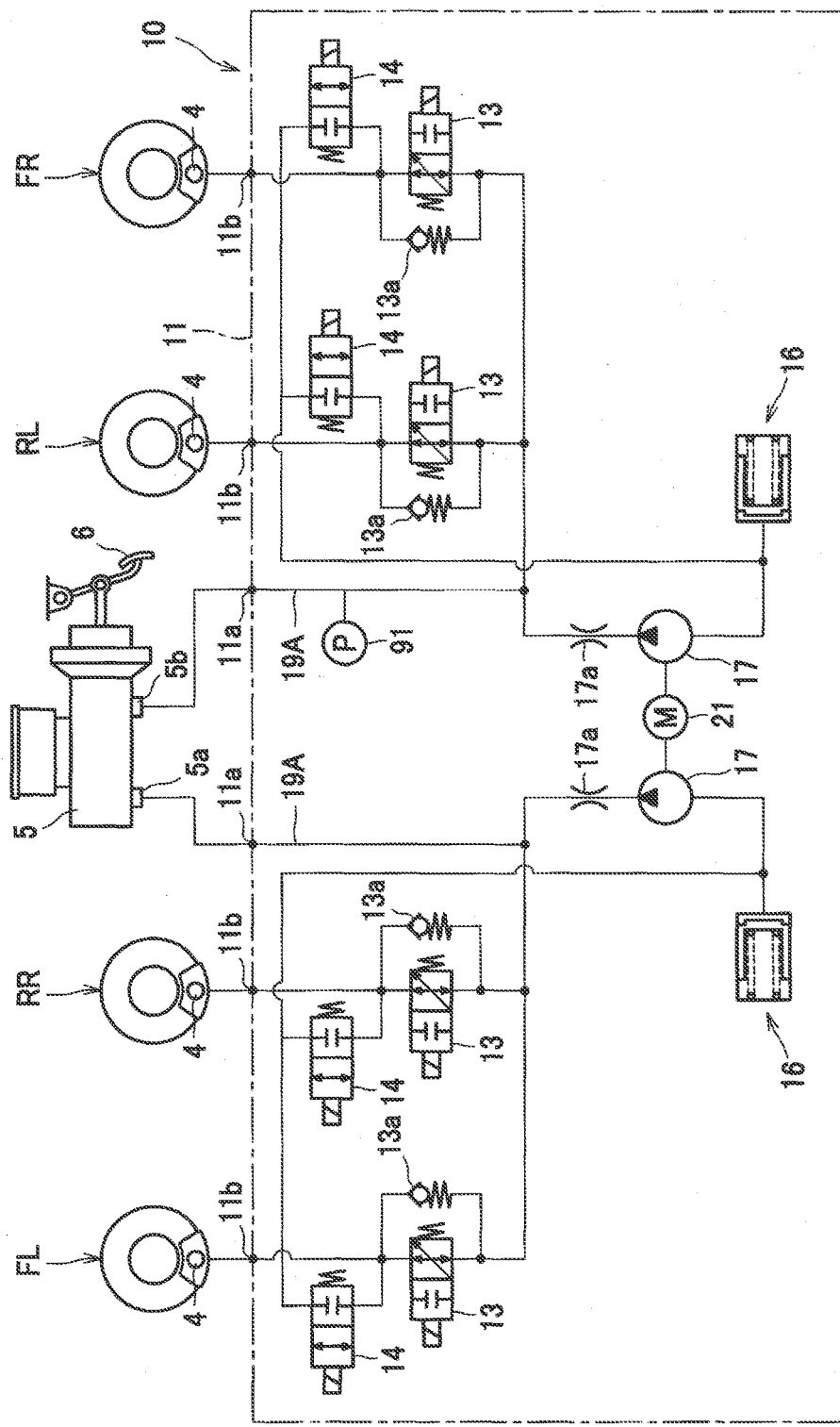
FIG. 2 is a block diagram showing the configuration of a hydraulic unit.

As shown in FIG. 2, the hydraulic unit 10 is disposed between the master cylinder 5 and the wheel brakes FL, RR, RL, FR. Two output ports 5a, 5b of the master cylinder 5 are connected to inlet ports 11a of the hydraulic unit 10, and outlet ports 11b of the hydraulic unit 10 are connected individually to the wheel brakes FL, RR, RL, FR. Then, normally, hydraulic lines in the hydraulic unit 10 communicate from the inlet ports 11a to the outlet ports 11b, whereby the pedal effort exerted on the brake pedal 6 is transmitted to the wheel brakes FL, RR, RL, FR.

The hydraulic unit 10 includes four inlet valves 13, four outlet valves 14 and four check valves 13a so as to correspond to the wheel brakes FL, RR, RL, FR. The hydraulic unit 10 includes additionally two reservoirs 16, two pumps 17, two orifices 17a and an electric motor 21 as an example of a motor which drives the two pumps 17 so as to correspond to two output hydraulic lines 19A which correspond to the two output ports 5a, 5b.

The inlet valves 13 are normally open proportional solenoid valves which are disposed on hydraulic lines from the master cylinder 5 to the wheel brakes FL, RR, RL, RR (upstream of the wheel brakes FL, RR, RL, FR). Being normally open, the inlet valves 13 permit a brake hydraulic pressure in the master cylinder 5 to be transmitted from the master cylinder 5 to the wheel brakes FL, RR, RL, FR. Additionally, the inlet valves 13 are closed by the control unit 100 when the wheels 3 are about to be locked to thereby cut off the transmission of hydraulic pressure from the brake pedal 6 to the wheel brakes FL, RR, RL, FR.

Although not illustrated in detail, valve bodies of the inlet valves 13 are biased towards the master cylinder 5 by magnetic force in proportion to an electric current applied, and the hydraulic pressures in the wheel brakes FL, RR, RL, FR can be controlled by the biasing force.

The outlet valves 14 are normally closed solenoid valves which are disposed on hydraulic lines from the wheel brakes FL, RR, RL, FR to the master cylinder 5 (on hydraulic lines communicating from hydraulic lines on sides of the inlet valves 13 which face the wheel cylinders 4 to the reservoirs 16, the pumps 17 and the master cylinder 5). To be specific, the outlet valves 14 are interposed on hydraulic lines from the wheel brakes FL, RR, RL, FR to the reservoirs 16. Although the outlet valves 14 are normally closed, the outlet valves 14 are opened by the control unit 100 when the wheels 3 are about to be locked, whereby hydraulic pressures which are applied to the wheel brakes FL, RR, RL, FR are released to the reservoirs 16.

The check valves 13a are connected parallel to the inlet valves 13. The check valves 13a are valves which permit only flows of brake fluid from the wheel brakes FL, RR, RL, FR towards the master cylinder 5. The check valves 13a permit the brake fluid to flow from the wheel brakes FL, RR, RL, FR towards the master cylinder 5 even with the inlet valves 13 kept closed when the input from the brake pedal 6 is released.

The reservoirs 16 function to absorb the brake fluid which is released from the wheel brakes FL, RR, RL, FR to flow thereto as a result of the outlet valves 14 being opened.

The pumps 17 are disposed on hydraulic lines from the reservoirs 16 to the master cylinder 5. The pumps 17 function to absorb the brake fluid which is absorbed in the reservoirs 16 and return the brake fluid so absorbed to the master cylinder 5 by way of the orifices 17a.

The inlet valves 13 and the outlet valves 14 are controlled to be opened and closed by the control unit 100 to thereby control the hydraulic pressures in the wheel cylinders 4 of the wheel brakes FL, RR, RL, FR (hereinafter, referred to as "wheel cylinder pressures Pw"). For example, in a normal state where the inlet valves 13 are opened and the outlet valves 14 are closed, with the brake pedal 6 kept depressed, the hydraulic pressure from the master cylinder 5 is transmitted to the wheel cylinders 4 as it is, whereby the hydraulic pressures in the wheel cylinders 4 are increased. When the inlet valves 13 are closed and the outlet valves 14 are opened, the brake fluid flows out of the wheel cylinders 4 towards the reservoirs 16, whereby the hydraulic pressures in the wheel cylinders 4 are decreased. When the inlet valves 13 and the outlet valves 14 are both closed, the wheel cylinder pressures Pw in the wheel cylinders 4 are held. In the event that an electric current is caused to flow to the inlet valves 13 to such an extent that the inlet valves 13 are not fully closed in the midst of an increase in master cylinder pressure Pm with the outlet valves 14 closed, the flow of brake fluid from the master cylinder 5 into the wheel cylinders 4 are limited in proportion to the electric current applied, thereby making it possible to increase the wheel cylinder pressures Pw gradually.

Next, the details of the control unit 100 will be described.

Figure 3:
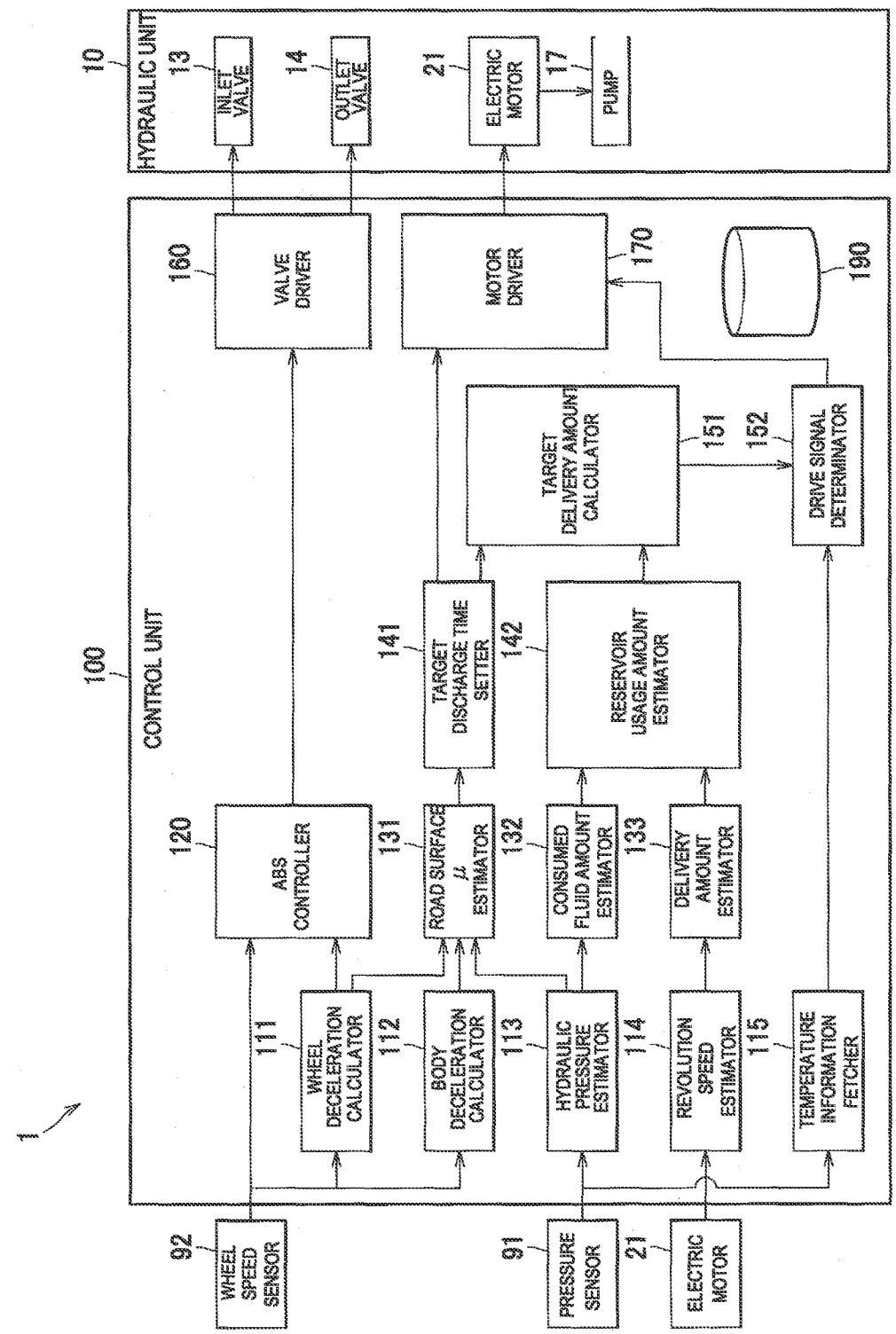
FIG. 3 is a block diagram showing the configuration of a control unit.

As shown in FIG. 3, the control unit 100 includes a wheel deceleration calculator 111, a body deceleration calculator 112, a hydraulic pressure estimator 113, a revolution speed fetcher 114, a temperature information fetcher 115, an antilock brake system (hereinafter, referred to as "ABS") controller 120, a road surface friction coefficient (hereinafter, referred to as a "road surface μ") estimator 131, a consumed fluid amount estimator 132, a delivery amount estimator 133, a target discharge time setter 141, a reservoir usage amount estimator 142, a target delivery amount calculator 151, a drive signal determinator 152, a valve driver 160, a motor driver 170 and a storage unit 190.

The wheel deceleration calculator 111 has a function to calculate wheel decelerations Aw of the wheels 3 based on wheel speeds Vw of the wheels 3 which are acquired from the wheel speed sensors 92. Here, deceleration means acceleration. Decelerations expressed by negative values mean that the wheels are decelerated, whereas decelerations expressed by positive values mean that the wheels are accelerated. Wheel decelerations Aw can be calculated, for example, by subtracting the previous values of the wheel speeds Vw from the current values thereof. The wheel deceleration calculator 111 outputs the calculated wheel decelerations Aw of the wheels 3 to the ABS controller 120 and the road surface μ estimator 131.

The body deceleration calculator 112 has a function to calculate a body deceleration Ac based on the wheel speeds Vw of the wheels 3 which are acquired from the wheel speed sensors 92. A body deceleration Ac can be calculated, for example, by subtracting the previous value of the body speed Vc calculated from the wheel speeds Vw from the current value thereof. When the ABS control is in operation, a body deceleration Ac is calculated from the wheel speeds Vw acquired when the previous pressure increase was started and wheel speeds Vw acquired when the current pressure increase is started. The body deceleration calculator 112 outputs the calculated body deceleration Ac to the road surface μ estimator 131.

The hydraulic pressure estimator 113 has a function to estimate wheel cylinder pressures Pw of the wheels 3 based on the master cylinder pressure Pm acquired from the pressure sensor 91 and control histories of the inlet valves 13 and the outlet valves 14 which are outputted from the ABS controller 120. The hydraulic pressure estimator 113 outputs the estimated wheel cylinder pressures Pw to the road surface μ estimator 131 and the consumed fluid amount estimator 132.

The rotation speed fetcher 114 has a function to acquire information on a rotation speed of the electric motor 21. Specifically, the rotation speed fetcher 114 acquires a counter electromotive force of the electric motor 21 as information on a rotation speed of the electric motor 21. The rotation speed fetcher 114 outputs the acquired information of the rotation speed of the electric motor 21 to the delivery amount estimator 133.

The temperature information fetcher 115 has a function to acquire a temperature of a brake fluid (hereinafter, referred to as a "fluid temperature") Tb from the pressure sensor 91.

The temperature information fetcher 115 outputs the acquired fluid temperature Tb to the drive signal determinator 152.

The ABS controller 120 determines whether or not an ABS control should be executed in relation to each of the wheels 3 based on the wheel speeds Vw of the wheels 3 which are acquired from the wheel speed sensors 92 and the wheel decelerations Aw which are calculated by the wheel deceleration calculator 111. If the ABS controller 120 determines that the ABS control should be executed on the wheels 3, the ABS controller 120 has a function to determine an instruction on a hydraulic pressure control to be executed (an instruction on which of a pressure decreasing control, a pressure holding control and a pressure increasing control should be executed) in relation to each of the wheels 3 during the ABS control.

Specifically, the ABS controller 120 calculates slip amounts SL of the wheels 3 based on the wheel speeds Vw of the wheels 3 and the body speed Vc which is estimated from the wheel speeds Vw. As slip amounts SL, for example, a value resulting from subtracting the wheel speed Vw from the body speed Vc or a slip ratio expressed as (Vc−Vw)/Vc can be used.

Then, the ABS controller 120 determines that the wheels 3 are about to be locked when the slip amounts SL become a predetermined pressure decreasing threshold SLth or greater and the wheel decelerations Aw are 0 or smaller and determines that the hydraulic pressure control to be executed is the pressure decreasing control. Additionally, the ABS controller 120 determines that the hydraulic pressure control to be executed is the pressure holding control when the wheel decelerations Aw are greater than 0. Further, the ABS controller 120 determines that the hydraulic pressure control to be executed is the pressure increasing control when the slip amounts SL are less than the pressure decreasing threshold SLth and the wheel decelerations Aw are 0 or smaller. The ABS controller 120 outputs the information on the determined instruction on the hydraulic pressure control to be executed (the instruction to decrease, hold or increase the pressure) to the valve driver 160.

The road surface μ estimator 131 has a function to estimate a road surface μ. Specifically, in starting an ABS control, the road surface μ estimator 131 estimates a road surface μ corresponding to each of the wheels 3 based on the wheel decelerations Aw of the wheels 3 which are calculated by the wheel deceleration calculator 111 and the wheel cylinder pressures Pw which are estimated by the hydraulic pressure estimator 113. Specifically, the road surface μ estimator 131 estimates a road surface μ corresponding to each of the wheels 3 based on the wheel decelerations Aw of the wheels 3, the wheel cylinder pressures Pw and a road surface friction coefficient estimation map.

Here, the road surface friction coefficient estimation map is a map which associates the magnitude (the absolute value) of the wheel deceleration Aw, the wheel cylinder pressure Pw and the road surface μ with one another and is preset through experiments or simulations. The road surface friction coefficient estimation map is set so that the greater the magnitude of the wheel deceleration Aw, the lower the road surface μ and the smaller the wheel cylinder pressure Pw, the lower the road surface μ. The road surface μ estimator 131 estimates a road surface μ using linear interpolation in the event that the wheel cylinder pressure Pw and the magnitude of the wheel deceleration Aw take values other than those shown on the road surface friction coefficient estimation map.

In the event that the pressure increasing control is executed twice in the ABS control, from this point on, the road surface μ estimator 131 estimates a road surface μ based on the body deceleration Ac calculated by the body deceleration calculator 112. Specifically, the road surface μ estimator 131 sets so that the road surface μ takes a smaller value as the magnitude of the body deceleration Ac becomes smaller.

The road surface μ estimator 131 outputs the estimated road surface μ to the target discharge time setter 141.

In the pressure decreasing control of the ABS control, the consumed fluid amount estimator 132 has a function to estimate a consumed fluid amount, which corresponds to an amount of brake fluid which flows from the wheel brakes FL, RR, RL, FR into the reservoirs 16, for each of the wheels 3 based on wheel cylinder pressures Pw resulting when the pressure decreasing control is started and wheel cylinder pressures Pw resulting when the pressure decreasing control is finished. Specifically, the consumed fluid amount estimator 132 estimates every unit time ΔT a current value of the wheel cylinder pressure Pw based on the previous value of the wheel cylinder pressure Pw, the unit time ΔT and a hydraulic pressure estimation map.

Figure 4A:
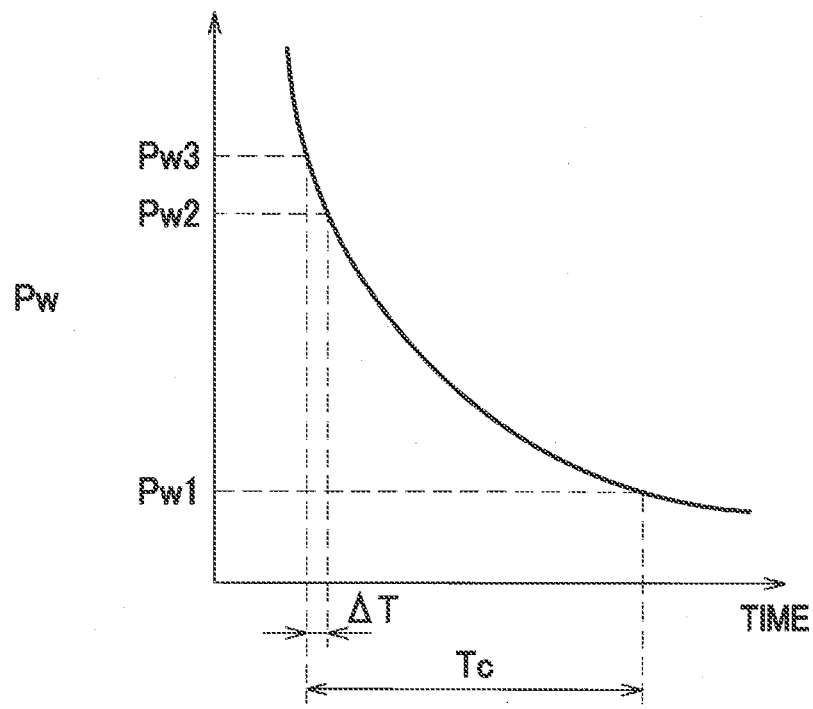
FIG. 4A is a chart showing a hydraulic pressure estimation map.

Here, as shown in FIG. 4A, the hydraulic pressure estimation map is a map which shows a change in wheel cylinder pressure Pw with time in the pressure decreasing control of the ABS control and is preset for each wheel 3 using experiments or simulations. For example, in the event that the previous value of the wheel cylinder pressure Pw is Pw3, the consumed fluid amount estimator 132 estimates that a current value of the wheel cylinder pressure Pw is Pw2 based on the unit time ΔT and the hydraulic pressure estimation map.

Then, the consumed fluid amount estimator 132 estimates a consumed fluid amount Vs based on the estimated current value of the wheel cylinder pressure Pw, the previous value of the wheel cylinder pressure Pw and a consumed fluid amount estimation map.

Figure 4B:
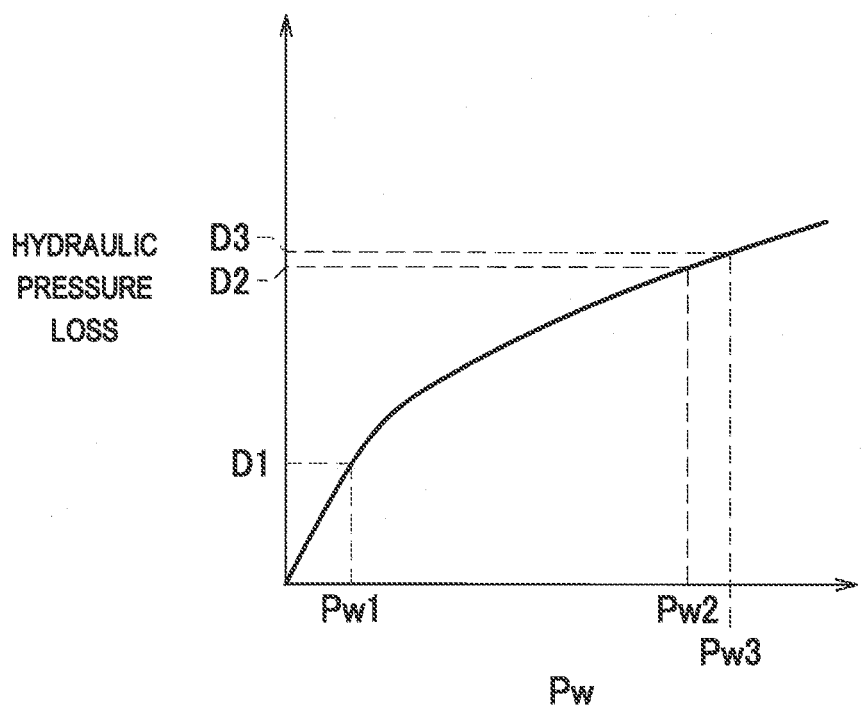
FIG. 4B is a chart showing a consumed fluid amount estimation map.

Here, as shown in FIG. 4B, the consumed fluid amount estimation map is a map which associates the wheel cylinder pressure Pw with a hydraulic pressure loss and is preset through experiments or simulations. The consumed fluid amount estimation map is set so that the hydraulic pressure loss becomes smaller as the wheel cylinder pressure Pw becomes smaller. For example, in the event that the previous value of the wheel cylinder pressure Pw is Pw3 and a current value thereof is Pw2, the consumed fluid amount estimator 132 estimates a hydraulic pressure loss D3 when the wheel cylinder pressure Pw is Pw3 and a hydraulic pressure loss D2 when the wheel cylinder pressure Pw is Pw2 based on the consumed fluid amount estimation map. Then, the consumed fluid amount estimator 132 estimates a consumed fluid amount Vs by subtracting the hydraulic pressure loss D2 from the hydraulic pressure loss D3.

The consumed fluid amount estimator 132 calculates consumed fluid amounts Vs every unit time ΔT in the pressure decreasing control, as a result of which the consumed fluid amount estimator 132 estimates a total consumed fluid amount in the decreasing control based on the wheel cylinder pressures Pw (for example, Pw3) resulting when the pressure decreasing control is started and the wheel cylinder pressures Pw (for example, Pw1) resulting when the pressure decreasing control is finished. The consumed fluid amount estimator 132 outputs the estimated consumed fluid amounts Vs to the reservoir usage amount module estimator 142.

The delivery amount estimator 133 has a function to estimate a delivery amount corresponding to an amount of brake fluid which is discharged from the reservoirs 16 by the driving of the pumps 17 during the pressure decreasing control of the ABS control. Specifically, the delivery amount estimator 133 estimates every unit time ΔT a delivery amount Vd based on the revolution speed (the counter electromotive force) of the electric motor 21 which the rotation speed fetcher 114 acquires and a delivery amount estimation map.

Figure 5:
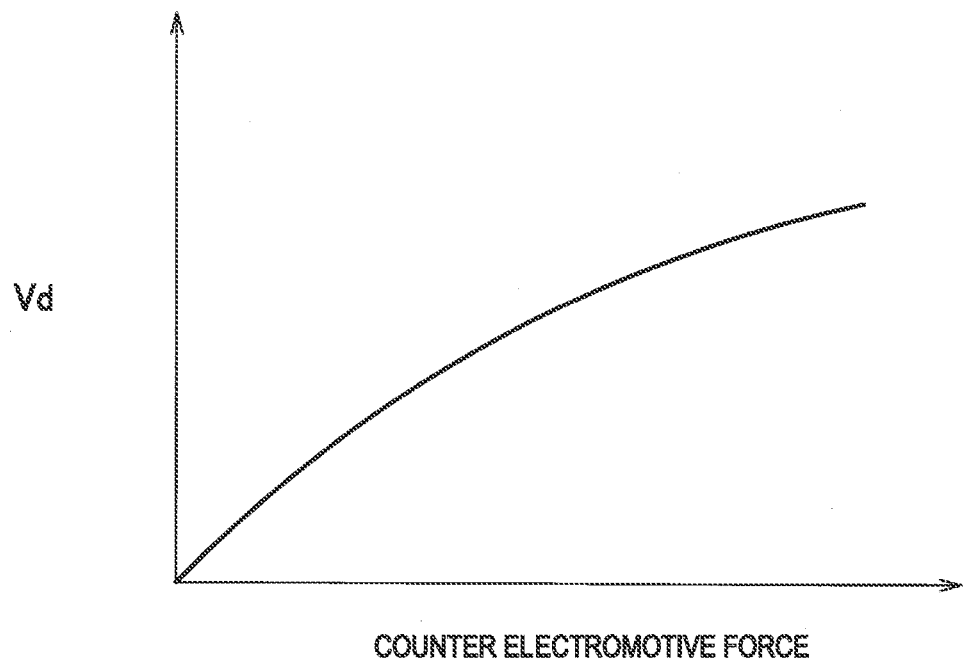
FIG. 5 is a chart showing a discharge amount estimation map.

Here, as shown in FIG. 5, the delivery amount estimation map is a map which associates the counter electromotive force of the electric motor 21 with the delivery amount Vd and is preset through experiments or simulations. The delivery amount estimation map is set so that the delivery amount Vd becomes greater as the magnitude of the counter electromotive force of the electric motor 21 becomes greater. The delivery amount estimator 133 outputs the estimated delivery amount Vd to the reservoir usage amount estimator 142.

The target discharge time setter 141 has a function to set a target discharge time Td which corresponds to a driving time of the electric motor 21 which is necessary to return the brake fluid accumulated in the reservoirs 16 to the master cylinder 5 based on the road surface μ estimated by the road surface μ estimator 131. Specifically, the target discharge time setter 141 sets a target discharge time Td based on the road surface μ and a target discharge time setting map as an example of a second map.

Figure 6:
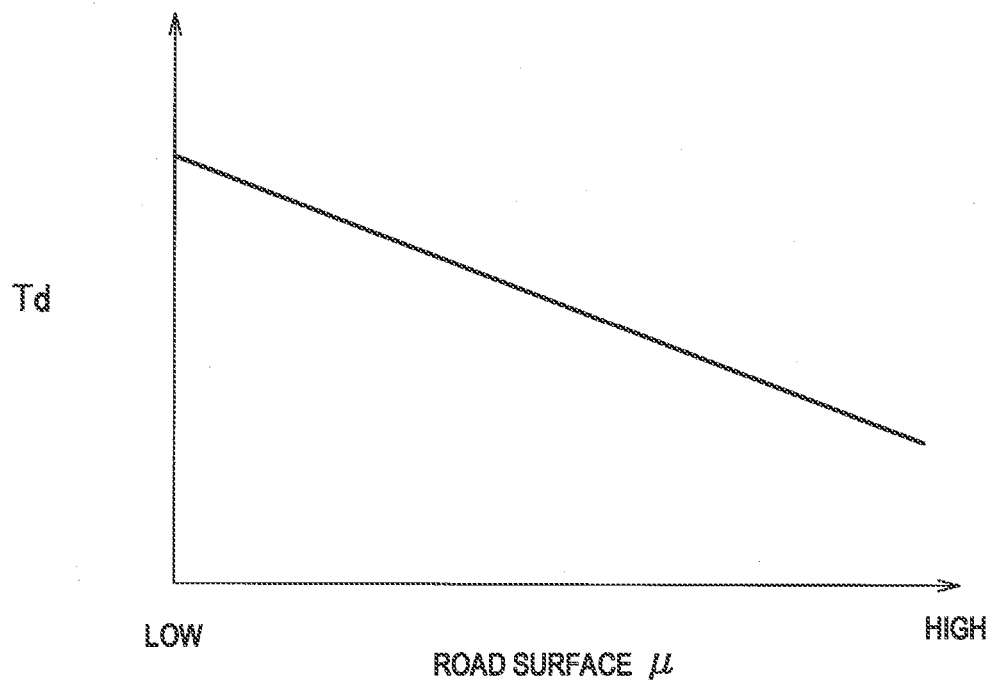
FIG. 6 is a chart showing a target discharge time setting map.

Here, as shown in FIG. 6, the target discharge time setting map is a map which associates the road surface μ with the target discharge time Td and is preset through experiments or simulations. The target discharge time setting map is set so that the target discharge time Td becomes shorter as the road surface μ becomes higher. By using the target discharge time setting map so set, the target discharge time setter 141 sets so that the target discharge time Td becomes longer as the road surface μ becomes lower, and the target discharge time Td becomes shorter as the road surface μ becomes higher.

In the event that the next pressure decreasing control is started before the target discharge time Td has elapsed since the end of the pressure decreasing control during the ABS control, the target discharge time setter 141 resets the target discharge time Td based on the road surface μ and the target discharge time setting map.

The target discharge time setter 141 outputs the target discharge time Td which has been set to the target delivery amount calculator 151 and the motor driver 170.

The reservoir usage amount estimator 142 has a function to estimate a reservoir usage amount which corresponds to an increase amount from an initial state (an empty state) of brake fluid within the reservoirs 16 in the pressure decreasing control in the ABS control. Specifically, the reservoir usage amount estimator 142 obtains every unit time ΔT a reservoir usage amount $Vr_n$ based on the delivery amount Vd estimated by the delivery amount estimator 133, the consumed fluid amount Vs estimated by the consumed fluid amount estimator 132 and the previous value $Vr_{n-1}$ of a reservoir usage amount. Specifically, the reservoir usage amount estimator 142 calculates a reservoir usage amount $Vr_n$ (a current value) by adding a value resulting from subtracting the delivery amount Vd from the consumed fluid amount Vs to the previous value $Vr_{n-1}$ of the reservoir usage amount ($Vr_n = Vr_{n-1} + (Vs - Vd)$). The reservoir usage amount estimator 142 outputs the estimated reservoir usage amount $Vr_n$ to the target delivery amount calculator 151.

The target delivery amount calculator 151 has a function to calculate a target delivery amount Vt which corresponds to an amount of brake fluid which is discharged from the reservoirs 16 per predetermined time (for example, per second). Specifically, the target delivery amount calculator 151 calculates a target delivery amount Vt based on the target discharge time Td set by the target discharge time setter 141 and the reservoir usage amount $Vr_n$ estimated by the reservoir usage amount estimator 142. More specifically, the target delivery amount calculator 151 sets a discharge time counter value TdC from the target discharge time Td. Specifically, the target delivery amount calculator 151 sets so that the target discharge time Td becomes the discharge time counter value TdC during the pressure decreasing control of the ABS control and sets every unit time ΔT so that a value resulting from subtracting the unit time ΔT from the previous value of the discharge time counter value TdC becomes the discharge time counter value Tdc after the pressure decreasing control (during the pressure holding control and the pressure increasing control). Then, the target delivery amount calculator 151 calculates a target delivery amount Vt by diving the reservoir usage amount $Vr_n$ by the discharge time counter value TdC. The target delivery amount calculator 151 outputs the information on the calculated target delivery amount Vt to the drive signal determinator 152.

The drive signal determinator 152 has a function to determine a drive signal for driving the electric motor 21, specifically, an indication voltage Vm for driving the electric motor 21. Specifically, the drive signal determinator 152 determines an indication voltage Vm based on the target delivery amount Vt calculated by the target delivery amount calculator 151, the fluid temperature Tb acquired by the temperature information fetcher 115 and an indication voltage setting map which is an example of a first map.

Figure 7:
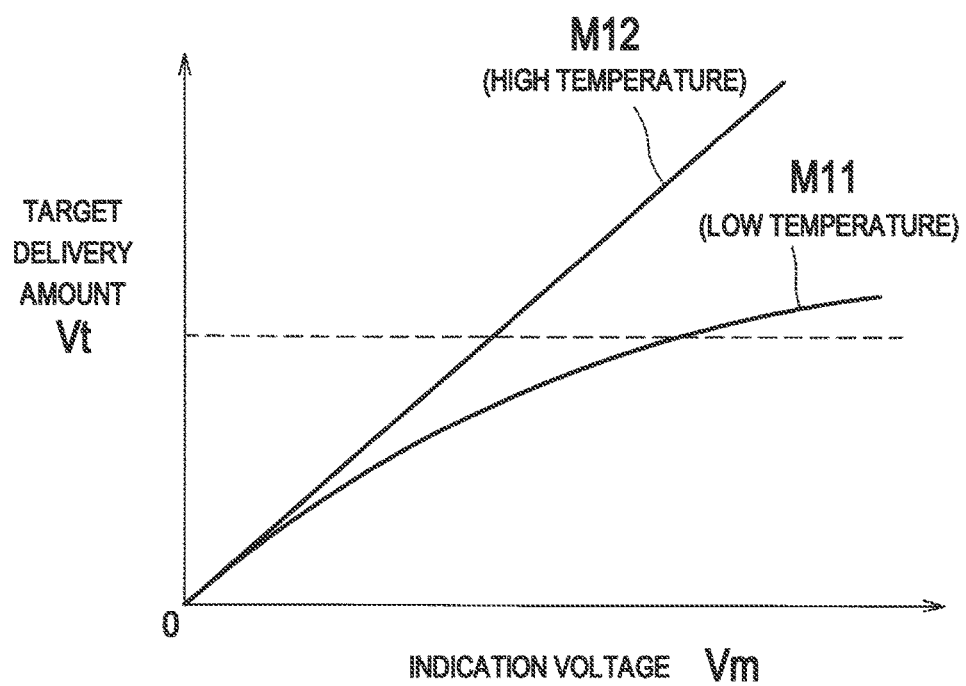
FIG. 7 is a chart showing an instruction voltage setting map.

Here, as shown in FIG. 7, the indication voltage setting map is a map which associates the target delivery amount Vt, the fluid temperature Tb and the instruction voltage Vm with one another and is preset through experiments or simulations. A plurality of indication voltage setting maps are set for fluid temperatures. FIG. 7 shows two maps including a map M11 which is referred to in the event that the fluid temperature Tb is a first temperature Tb1 and a map M12 which is referred to when the fluid temperature Tb is a second temperature Tb2 which is higher than the first temperature Tb1.

The indication voltage setting map is set so that the magnitude of the instruction voltage Vm becomes greater as the target delivery amount Vt becomes greater. Additionally, for example, with the same target delivery amount Vt (refer to dashed line) the indication voltage setting map is set so that the magnitude of the indication voltage Vm becomes greater as the fluid temperature Tb becomes lower (that is, the indication voltage setting map is the map M11). By doing so, with the same target delivery amount Vt, the drive signal setter 152 sets so that the magnitude of the indication voltage Vm becomes greater as the fluid temperature Tb becomes lower and that the magnitude of the indication voltage Vm becomes smaller as the fluid temperature Tb becomes higher.

The map (for example, M11) which is referred to in the event that the fluid temperature Tb is low is set so that a change ratio (dVt/dVm) of the target delivery amount Vt to the indication voltage Vm becomes smaller as the indication voltage Vm becomes greater. To describe this by reference to FIG. 7, the map which is referred to in the event that the fluid temperature Tb is low is set so that the change ratio dVt/dVm becomes smaller or is set into a curve which is convex upwards in FIG. 7 and which comes nearer to an axis of abscissa of FIG. 7.

The drive signal determinator 152 outputs the information on the determined indication voltage Vm to the motor driver 170.

The valve driver 160 has a function to control the wheel cylinder pressures Pw by controlling the inlet valves 13 and the outlet valves 14 based on the information on the instruction on the hydraulic pressure control to be executed which is outputted from the ABS controller 120.

Specifically, in the event that the instruction on the hydraulic pressure control to be executed is the pressure decreasing control, the valve driver 160 closes the inlet valves 13 and opens the outlet valves 14 by causing an electric current to flow to the inlet valves 13 and the outlet valves 14 so as to decrease the wheel cylinder pressures Pw. Additionally, in the event that the instruction on the hydraulic pressure control to be executed is the pressure holding control, the valve driver 160 closes both the inlet valves 13 and the outlet valves 14 by causing an electric current to flow to the inlet valves 13 and causing no electric current to flow to outlet valves 14 so as to hold the wheel cylinder pressures Pw.

Further, in the event that the instruction on the hydraulic pressure control to be executed is the pressure increasing control, the valve driver 160 closes the outlet valves 14 by causing no electric current to flow to the outlet valves 14 and causes no electric current to flow to the inlet valves 13 or causes a drive electric current corresponding to an indicated hydraulic pressure to flow so as to control a difference in pressure between an upstream side and a downstream side of the inlet valves 13 to thereby control so that the wheel cylinder pressures Pw are increased at an intended pressure increase rate.

The motor driver 170 has a function to execute a control to return the brake fluid which is accumulated within the reservoirs 16 during the pressure decreasing control of the ABS control from the reservoirs 16 to the master cylinder 5 by controlling the driving of the electric motor 21 which drives the pumps 17 based on the information outputted from the target discharge time setter 141 and the drive signal determinator 152.

Specifically, the motor driver 170 drives the electric motor 21 during the ABS control including the pressure decreasing control by applying to the electric motor 21 the indication voltage Vm which is determined based on the target delivery amount Vt calculated by the target delivery amount calculator 151. Then, the motor driver 170 stops the driving of the electric motor 21 even while the ABS control is in operation by stopping the application of the indication voltage Vm in the event that the target discharge time Td has elapsed since the end of the pressure decreasing control.

The storage unit 190 is a unit for storing the thresholds, the maps, the estimation values and the calculation values which are used, estimated and calculated during the operations of the components that have been described heretofore.

Next, operations which are performed by the control unit 100 configured as described above will be described. Operations shown in FIG. 8 are performed repeatedly every predetermined control cycle (the unit time ΔT).

Figure 8:
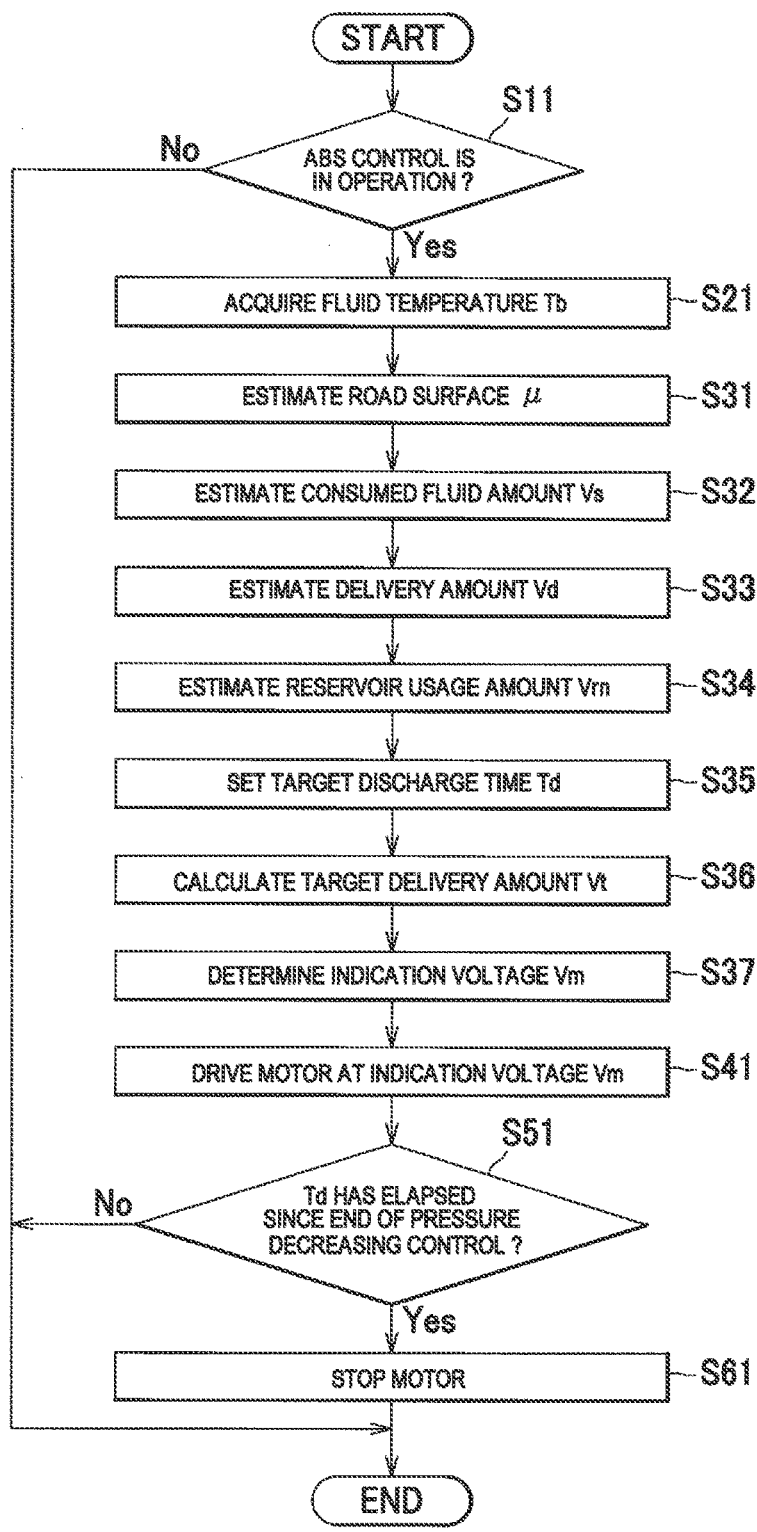
FIG. 8 is a flow chart showing operations performed by the control unit.

As shown in FIG. 8, the control unit 100 firstly determines whether or not the ABS control is in operation (S11). Then, if it determines that the ABS control is not in operation (S11, No), the control unit 100 ends the current operation.

On the other hand, if it is determined that the ABS control is in operation (S11, Yes), the control unit 100 acquires a fluid temperature Tb (S21). Additionally, the control unit 100 estimates a road surface μ (S31). The control unit 100 estimates a consumed fluid amount Vs (S32) and estimates a delivery amount Vd (S33). Then, the control unit 100 estimates a reservoir usage amount $Vr_n$ based on the delivery amount Vd, the consumed fluid amount Vs and the previous value $Vr_{n-1}$ of a reservoir usage amount (S34) and sets a target discharge time Td based on the road surface μ (S35). Further, the control unit 100 calculates a target delivery amount Vt based on the reservoir usage amount $Vr_n$ and the target discharge time Td (S36). Then, the control unit 100 determines an indication voltage Vm based on the target delivery amount Vt and the fluid temperature Tb (S37).

Then, the control unit 100 drives the electric motor 21 by the indication voltage Vm (S41) and returns the brake fluid accumulated in the reservoirs 16 from the reservoirs 16 to the master cylinder 5. Then, the control unit 100 determines whether or not the target discharge time Td has elapsed since the end of the pressure decreasing control (S51). If it determines that the target discharge time Td has not elapsed (S51, No), the control unit 100 ends the current operation. On the other hand, if it determines that the target discharge time Td has elapsed (S51, Yes), the control unit 100 stops the driving of the electric motor 21 (S61) and ends the current operation since almost all the brake fluid in the reservoirs 16 is returned to the master cylinder 5 and the reservoirs 16 becomes almost empty.

In the event that the pressure holding control or the pressure increasing control of the ABS control is performed continuously after step S61, since the amount of brake fluid within the reservoirs 16 is not increased from the empty state, the control unit 100 estimates in step S34 that the reservoir usage amount $Vr_n$ is 0 and calculates a target delivery amount Vt as 0 in step S36. By doing so, the control unit 100 determines an indication voltage Vm as 0 in step S37. As a result of this, the control unit 100 ends the current operation without driving the electric motor 21 even while the ABS control is in operation.

Next, an example of a control performed by the control unit 100 will be described.

Figure 9:
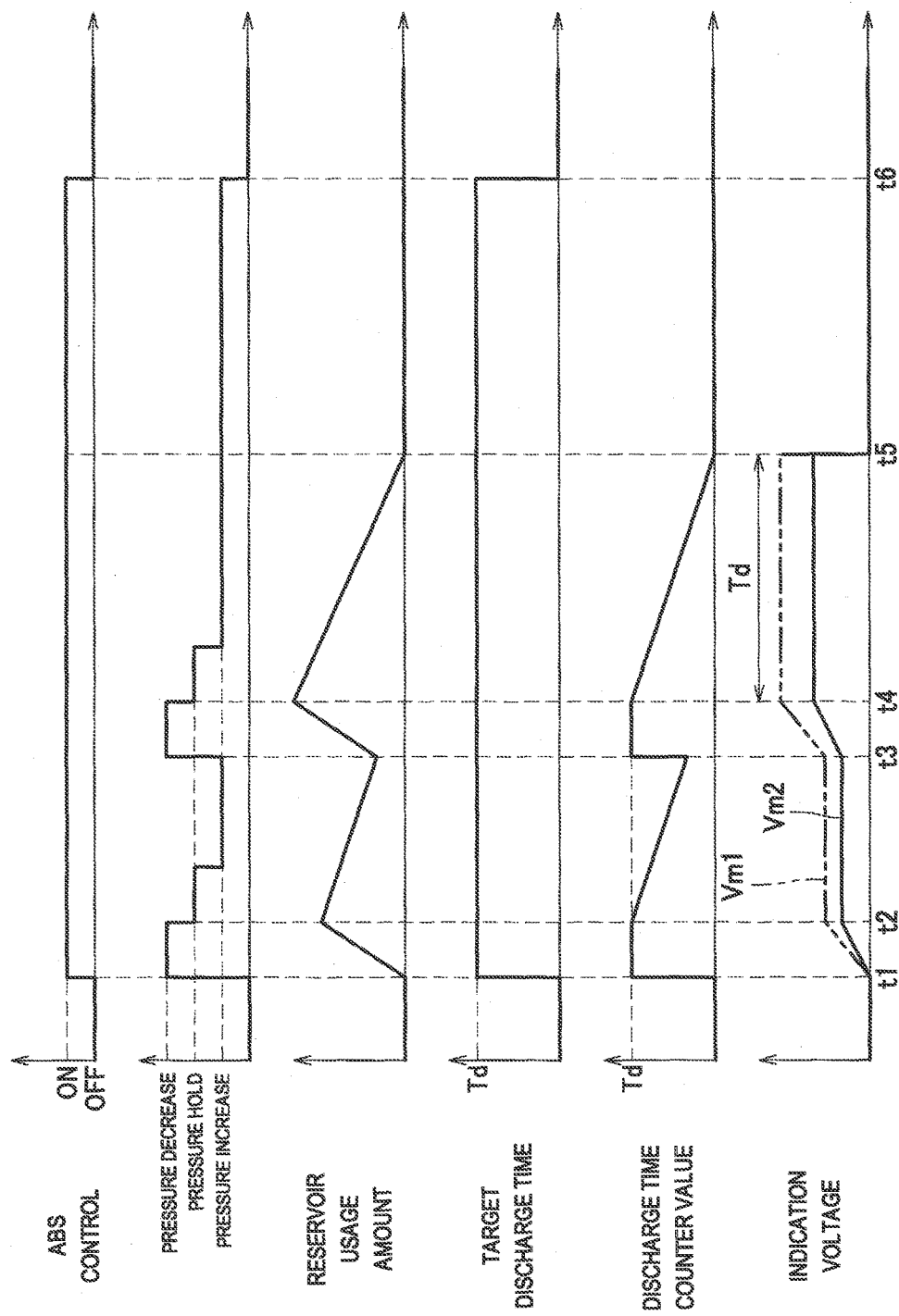
FIG. 9 is a time chart showing controls performed by the control unit.

As shown in FIG. 9, when the ABS control is started (ON) to thereby start the pressure decreasing control at time t1, the inlet valves 13 are closed and the outlet valves 14 are opened, whereby the brake fluid flows out of the wheel cylinders 4 into the reservoirs 16, thereby increasing the reservoir usage amount $Vr_n$ (the amount of brake fluid in the reservoirs 16).

When the ABS control is started, a reservoir usage amount $Vr_n$, a target discharge time Td, a discharge time counter value TdC, a target delivery amount Vt and an indication voltage Vm are set every control cycle (unit time ΔT), and the electric motor 21 is driven by the indication voltage Vm so set. Although part of the brake fluid is discharged from the reservoirs 16 to the master cylinder 5 as a result of the pumps 17 being driven by the electric motor 21 during the pressure decreasing control (time t1 to t2), in the event that the amount of brake fluid which flows out of the wheel cylinders 4 into the reservoirs 16 is greater, the reservoir usage amount $Vr_n$ is increased gradually.

When the pressure decreasing control is finished and the pressure holding control is started at time t2, the brake fluid is stopped from flowing out of the wheel cylinders 4 into the reservoirs 16 as a result of the outlet valves 14 being closed, and therefore, the reservoir usage amount $Vr_n$ is stopped from increasing. Thereafter, the pumps 17 are driven based on the indication voltage Vm so that the brake fluid flows from the reservoirs 16 towards the master cylinder 5, whereby the reservoir usage amount $Vr_n$ decreases.

When the next pressure decreasing control is started before the target discharge time Td has elapsed from the end (time t2) of the pressure decreasing control (before the discharge time counter value TdC becomes 0) at time t3, the reservoir usage amount $Vr_n$ increases again.

Then, when the pressure decreasing control ends again and the pressure holding control starts at time t4, the reservoir usage amount $Vr_n$ stops increasing, and therefore, the brake fluid is discharged from the interior of the reservoirs 16 towards the master cylinder 5 as a result of the pumps 17 being driven based on the indication voltage Vm, whereby the reservoir usage amount $Vr_n$ starts decreasing again.

When the target discharge time Td has elapsed since the end (time t4) of the pressure decreasing control (the discharge time counter value TdC becomes 0) at time t5, the reservoirs 16 become empty, and therefore, even when the ABS control is in operation (ON), the electric motor 21 is stopped from being driven. Thereafter, as shown at time t5 to t6, since the reservoir usage amount $Vr_n$ is 0, even though the ABS control is in operation, the electric motor 21 is never driven, as long as the pressure decreasing control is started again.

In this embodiment, since the indication voltage Vm is determined based on the target delivery amount Vt, the fluid temperature Tb and the indication voltage setting map in FIG. 7, with the road surface μ and the target delivery amount Vt being the same, in the event that the fluid temperature Tb is high, for example, the map M12 is referred to, and the indication voltage Vm is set to a small voltage Vm2, whereas in the event that the fluid temperature is low, for example, the map M11 is referred to, and the indication voltage Vm is set to a great voltage Vm1.

Due to this, in the event that the fluid temperature Tb is high whereby the viscosity of the brake fluid becomes low, allowing the brake fluid to flow easily, as indicated by a solid line in FIG. 9, the electric motor 21 can be driven at a slow revolution speed by applying the small indication voltage Vm2, thereby making it possible to suppress the consumed electric power at the electric motor 21. Additionally, since the electric motor 21 revolves at the slow revolution speed, the operation noise of the electric motor 21 can be made inconspicuous. On the other hand, in the event that the fluid temperature Tb is low whereby the viscosity of the brake fluid becomes high, making it difficult for the brake fluid to flow, as indicated by a chain double-dashed line in FIG. 9, the electric motor 21 can be driven at a great revolution speed by applying the great indication voltage Vm1, and therefore, the delivery pressure of the pumps 17 can be increased to a great level, thereby making it possible to allow the braking fluid with the high viscosity to flow smoothly.

Figure 10:
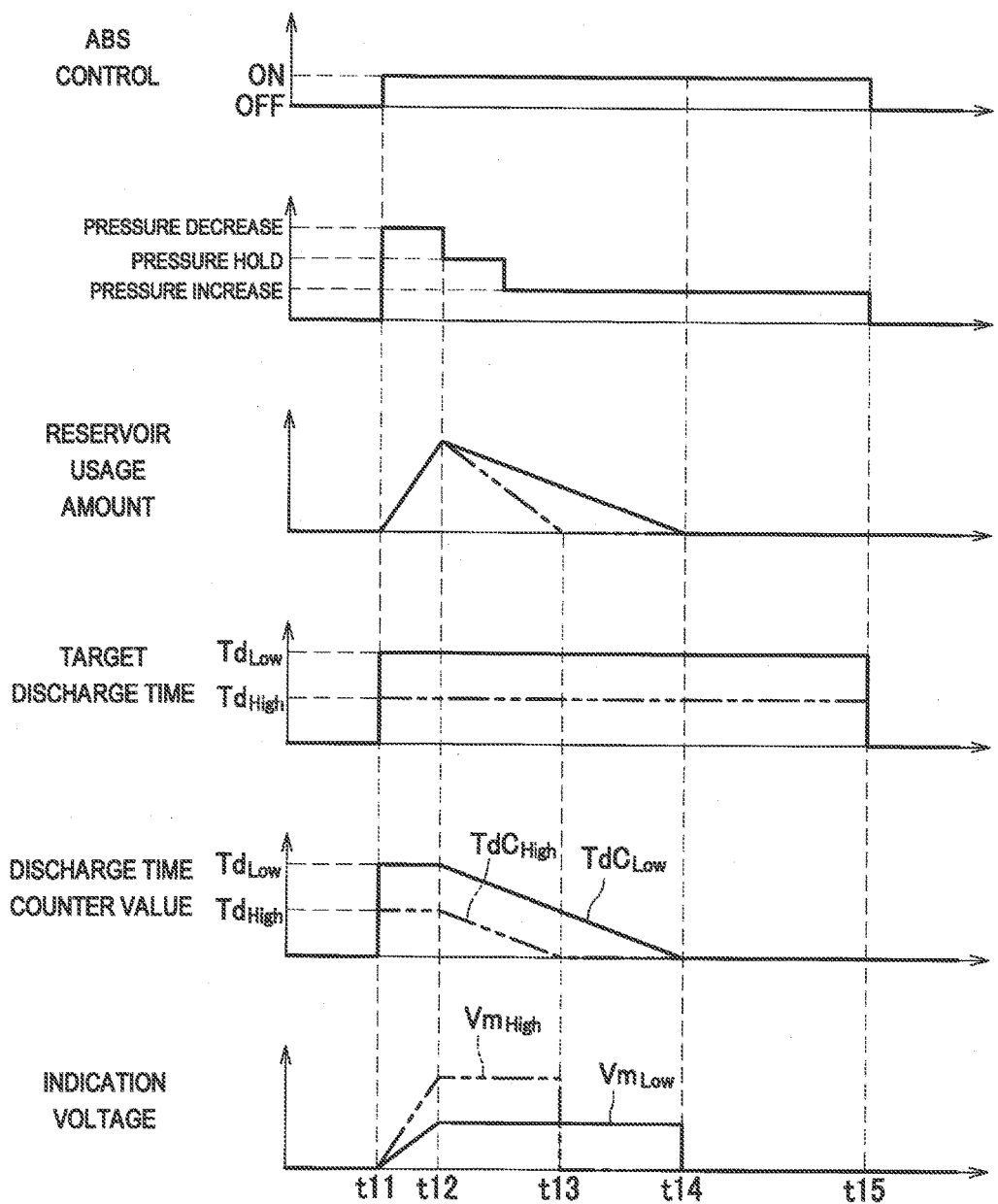
FIG. 10 is a time chart showing controls performed by the control unit.

In the embodiment, since the target discharge time Td is set based on the road surface μ and the target discharge time setting map shown in FIG. 6, as shown in FIG. 10, in the event that the road surface μ is low, the target discharge time Td is set at a long time $Td_{Low}$ (a great value), whereby the discharge time counter value TdC takes a great value $TdC_{Low}$, whereas in the event that the road surface μ is high, the target discharge time Td is set at a short time $Td_{High}$ (a small value), whereby the discharge time counter value TdC takes a small value $TdC_{High}$. In addition, since the target delivery amount Vt is calculated by dividing the reservoir usage amount $Vr_n$ by the discharge time counter value TdC, in the event that the road surface μ is low, the discharge time counter value TdC takes a great value $TdC_{Low}$, whereby the target delivery amount Vt is set at a small value, whereas in the event that the road surface μ is high, the discharge time counter value TdC takes a small value $TdC_{High}$, whereby the target delivery amount Vt is set at a great value. Further, since the indication voltage Vm is set based on the target delivery amount Vt, the fluid temperature Tb and the indication voltage setting map shown in FIG. 7, with the fluid temperature Tb remaining the same, in the event that the road surface μ is low, the target delivery amount Vt takes a small value, whereby the indication voltage Vm is set at a small voltage $Vm_{Low}$. In the event that the road surface μ is high, the target delivery amount Vt takes a great value, whereby the indication voltage Vm is set at a great voltage $Vm_{High}$.

As such, on a low μ road where the road noise becomes low, as indicated by a solid line in FIG. 10, the electric motor 21 is driven at a small revolution speed for the long time (the target discharge time $Td_{Low}$) by applying the small indication voltage $Vm_{Low}$ from time t12 to time t14, thereby making it possible to make the operation noise of the electric motor 21 inconspicuous. On the other hand, on a high μ road where the road noise becomes high, as indicated by a chain double-dashed line in FIG. 10, even though the electric motor 21 is driven at a great revolution speed for the short time (the target discharge time $Td_{High}$) by applying the great indication voltage $Vm_{High}$ from time t12 to time t13, it is possible to make the operation noise of the electric motor 21 inconspicuous.

Thus, as has been described heretofore, according to this embodiment, the following working effects can be obtained.

Since the indication voltage Vm which corresponds suitably to the target delivery amount Vt and the fluid temperature Tb can be determined by determining the indication voltage Vm to be applied to the electric motor 21 based on the target delivery amount Vt and the fluid temperature Tb, not only can the consumed electric power be suppressed but also the brake fluid is allowed to flow smoothly.

Specifically, since the magnitude of the indication voltage Vm becomes smaller as the fluid temperature Tb becomes higher, when compared, for example, with the method in which the magnitude of the indication voltage is set at a great value irrespective of the fluid temperature so that the brake fluid is allowed to flow smoothly even when the fluid temperature is low, in the event that the fluid temperature Tb is high, allowing the brake fluid to flow easily, the magnitude of the indication voltage Vm can be made small, whereby the consumption of electric power can be suppressed. In addition, as this occurs, since the revolution speed of the electric motor 21 becomes slower, the operation noise of the electric motor 21 can be made inconspicuous. Additionally, in the event that the fluid temperature Tb is low, making it difficult for the brake fluid to flow, the magnitude of the indication voltage Vm can be made greater, thereby making it possible for the brake fluid to flow smoothly.

In addition, since the indication voltage Vm is determined based on the preset indication voltage setting map, the drive signal can be determined easily without performing a calculation.

Of the indication voltage setting maps, the map (for example, M1) which is referred to when the fluid temperature Tb is low is set so that the change ratio dVt/dVm becomes smaller as the indication voltage Vm becomes greater. Therefore, the indication voltage Vm can be prevented from being determined to be a value which is greater than required. This can suppress the consumption of electric power even in the event that the fluid temperature Tb is low.

Additionally, since the target delivery amount Vt based on which the indication voltage Vm is determined is calculated based on the amount of brake fluid within the reservoirs 16 (the reservoir usage amount $Vr_n$) and the target discharge time Td which is set based on the road surface μ, the electric motor 21 can be driven at the revolution speed which corresponds to the road surface condition. This can make the operation nose of the electric motor 21 inconspicuous.

Since the reservoir usage amount $Vr_n$ is estimated by using the consumed fluid amount Vs, the delivery amount Vd and the previous value $Vr_{n-1}$ of the reservoir usage amount, when compared, for example, with the case where the reservoir usage amount $Vr_n$ is estimated by using only the consumed fluid amount Vs, the reservoir usage amount $Vr_n$ can be obtained accurately.

Since the target discharge time Td is set shorter as the road surface μ is higher, on the high μ road where the road noise is great, the electric motor 21 can be driven at a fast revolution speed for a short period of time. Therefore, the operation noise of the electric motor 21 can be made inconspicuous as a result of the driving time of the electric motor 21 being shortened. In addition, since the target discharge time Td is set longer as the road surface μ becomes lower, on the low μ road where the road noise is small, the electric motor 21 can be driven at a slow revolution speed for a long period of time. Therefore, the operation noise of the electric motor 21 can be made inconspicuous as a result of the revolution speed of the electric motor 21 becoming slow.

Since the target discharge time Td is set based on the preset target discharge time setting map, the target discharge time Td can be set easily without performing a calculation.

The invention is not limited t the embodiment, and hence, the invention can be applied in various forms which will be described below.

For example, the invention may be applied to a vehicle brake hydraulic pressure control apparatus which executes not only the ABS control but also other vehicle posture controls than the ABS control.

In the embodiment, the configuration is adopted in which in the event that the pressure increasing control is executed twice in the ABS control, the control unit 100 estimates a road surface μ based on the body deceleration Ac from that point on. However, the invention is not limited thereto. For example, a configuration may be adopted in which in the event that the pressure increasing control is executed three times or more in the ABS control, the control unit estimates a road surface μ based on the body deceleration from that point on. In addition, a configuration may be adopted in which the control unit estimates a road surface μ based the wheel cylinder pressures and the wheel decelerations of the wheels irrespective of the number of times of execution of the pressure increasing control.

In the embodiment described above, the configuration is adopted in which the control unit 100 uses the estimated wheel cylinder pressures Pw in executing the ABS control. However, the invention is not limited thereto. For example, a configuration may be adopted in which the control unit uses wheel cylinder pressures which are acquired from sensors for detecting wheel cylinder pressures of the wheels in executing the ABS control.

In the embodiment described above, the configuration is adopted in which the control unit 100 calculates a reservoir usage amount $Vr_n$ and a target delivery amount Vt every control cycle. However, the invention is not limited thereto. For example, a configuration may be adopted in which the control unit calculates a reservoir usage amount and a target delivery amount at the end of one pressure decreasing control.

To describe an example here, in calculating a reservoir usage amount, as shown in FIG. 4A, wheel cylinder pressures Pw1 at the end of the pressure decreasing control are estimated based on the wheel cylinder pressures Pw3 at the start of the pressure decreasing control, the control time Tc of the pressure decreasing control and the hydraulic pressure estimation map at the end of the pressure decreasing control. Then, as shown in FIG. 4B, a hydraulic pressure loss D1 when the wheel cylinder pressures are Pw1 and a hydraulic pressure loss D3 when the wheel cylinder pressures are Pw3 are estimated based on the wheel cylinder pressures Pw1, Pw3 and the consumed fluid amount estimation map. Then, a consumed fluid amount during the pressure decreasing control is estimated by subtracting the hydraulic pressure loss D1 from the hydraulic pressure loss D3. Additionally, a delivery amount is estimated based on the revolution speed (the counter electromotive force) of the motor and the delivery amount estimation map shown in FIG. 5 every unit time during the pressure decreasing control, and the deliveries estimated every unit time are integrated to thereby estimate a total delivery amount. Then, a reservoir usage amount can be calculated by adding a value resulting from subtracting the total delivery amount from the consumed fluid amount during the pressure decreasing control to the reservoir usage amount at the end of the previous pressure decreasing control. In addition, a target delivery amount can be calculated by dividing the reservoir usage amount by the target discharge time set based on the road surface μ at the end of the pressure decreasing control.

In the embodiment described above, the indication voltage Vm (the drive signal) is determined based on the fluid temperature Tb. However, the invention is not limited thereto. For example, since the consumed fluid amount Vs and the delivery amount Vd can possibly change depending upon the fluid temperature, the consumed fluid amount Vs, the delivery amount Vd, and the reservoir usage amount $Vr_n$ and the target delivery amount Vt which are estimated based on the consumed fluid amount Vs and the delivery amount Vd may also be set based on the fluid temperature. Additionally, the target discharge time Td may also be set based on the fluid temperature. As a specific method, for example, such settings based on the fluid temperature can be realized by setting pluralities of hydraulic pressure estimation maps, consumed fluid amount estimation maps, delivery amount estimation maps and target discharge time estimation maps for specified fluid temperatures.

In the embodiment described above, the plurality of indication voltage setting maps as the first map are set for the specified fluid temperatures Tb. However, the invention is not limited thereto. For example, a plurality of indication voltage setting maps may not be set for the specified fluid temperatures Tb but be set for predetermined temperature ranges such as Tb1 or higher and less than Tb2 and Tb2 or higher and less than Tb3 (Tb1<Tb2<Tb3).

In the embodiment described above, the configuration is adopted in which the temperature information fetcher 115 acquires the fluid temperature Tb from the pressure sensor 91. However, the invention is not limited thereto. For example, a configuration may be adopted in which a fluid temperature is acquired from a temperature sensor which is provided separately from the pressure sensor. Additionally, the invention may adopt not only the configuration in which the temperature information fetcher acquires a fluid temperature from the sensor which detects a fluid temperature directly but also a configuration in which the temperature information fetcher acquires a fluid temperature by estimating a fluid temperature based on the information acquired from an outside air temperature sensor.

The invention claimed is:

1. A vehicle brake hydraulic pressure control apparatus including:
   an inlet valve interposed on a hydraulic line extending from a hydraulic pressure source to a wheel brake;
   an outlet valve interposed on a hydraulic line extending from the wheel brake to a reservoir;
   a pump interposed on a hydraulic line extending from the reservoir to the hydraulic pressure source;
   a motor configured to drive the pump; and
   a control unit configured to execute an antilock brake control, and to execute a control to return a brake fluid accumulated in the reservoir due to a pressure decreasing control in the antilock brake control to the hydraulic pressure source by driving the motor,
   wherein the control unit includes:
      a target delivery amount calculator configured to calculate a target delivery amount which corresponds to an amount of brake fluid discharged from the reservoir per a predetermined time;
      a temperature information fetcher configured to acquire a temperature of the brake fluid; and
      a drive signal determinator configured to determine a drive signal of the motor based on the target delivery amount and the temperature of the brake fluid,
   wherein the target delivery amount calculator calculates the target delivery amount based on a target discharge time set by a target discharge time setter and a reservoir usage amount estimated by a reservoir usage amount estimator.

2. The vehicle brake hydraulic pressure control apparatus of claim 1,
   wherein the drive signal is an indication voltage for driving the motor, and
   wherein the drive signal determinator decreases a magnitude of the indication voltage lower as the temperature of the brake fluid becomes higher.

3. The vehicle brake hydraulic pressure control apparatus of claim 1,
   wherein the drive signal determinator determines the drive signal based on a preset first map which associates the target delivery amount, the temperature of the brake fluid and the drive signal.

4. The vehicle brake hydraulic pressure control apparatus of claim 1, wherein the control unit further includes:
   a wheel deceleration calculator configured to calculate wheel deceleration of the wheel based on wheel speed of the wheel;
   a body deceleration calculator configured to calculate a body deceleration based on the wheel speed of the wheel;
   a hydraulic pressure estimator configured to estimate wheel cylinder pressure of the wheel based on a master cylinder pressure and control histories of the inlet valve and the outlet valve;
   a delivery amount estimator configured to estimate a delivery amount corresponding to an amount of the brake fluid which is discharged from the reservoir by the pump during pressure decreasing control;
   a rotation speed fetcher configured to acquire a counter electromotive force of the motor as information on a rotation speed of the motor, the rotation speed fetcher outputs the acquired information of the rotation speed of the motor to the delivery amount estimator; and
   a consumed fluid amount estimator configured to estimate a consumed fluid amount corresponding to an amount of the brake fluid which flows from the wheel brake into the reservoir based on the wheel cylinder pressure resulting when the pressure decreasing control is started and the wheel cylinder pressure resulting when the pressure decreasing control is finished.

5. The vehicle brake hydraulic pressure control apparatus of claim 4, wherein the temperature information fetcher outputs an acquired fluid temperature to the drive signal determinator.

6. The vehicle brake hydraulic pressure control apparatus of claim 5,
   wherein the road surface μ estimator is configured to estimate a road surface μ corresponding to the wheel based on the wheel deceleration of the wheel calculated by the wheel deceleration calculator and the wheel cylinder pressure estimated by the hydraulic pressure estimator.

7. The vehicle brake hydraulic pressure control apparatus of claim 4, wherein the consumed fluid amount estimator estimates every unit time ΔT a current value of the wheel cylinder pressure based on a previous value of the wheel cylinder pressure, the unit time ΔT and a hydraulic pressure estimation map.

8. The vehicle brake hydraulic pressure control apparatus of claim 1, wherein the target delivery amount calculator sets so that the target discharge time becomes a discharge time counter value during the pressure decreasing control and sets every unit time so that a value resulting from subtracting the unit time ΔT from a previous value of the discharge time counter value becomes the discharge time counter value after the pressure decreasing control, then, the target delivery amount calculator calculates the target delivery amount by dividing the reservoir usage amount by the discharge time counter value, which is output to the drive signal determinator.

9. The vehicle brake hydraulic pressure control apparatus of claim 8, further comprising setting a map when the fluid temperature is at a predetermined low temperature so that a change ratio (dVt/dVm) of the target delivery amount to the drive signal becomes smaller as the drive signal becomes greater.

10. The vehicle brake hydraulic pressure control apparatus of claim 1, wherein the drive signal is determined based on the target delivery amount, the fluid temperature and a drive signal setting map, with a road surface μ and the target delivery amount being equal, when the fluid temperature is higher than the predetermined low temperature, the drive signal is set to a smaller voltage, and when the fluid temperature is at the predetermined low temperature, the drive signal is set to a greater voltage.

11. The vehicle brake hydraulic pressure control apparatus of claim 1, wherein the drive signal is set based on the target delivery amount, the fluid temperature and a drive signal setting map, with the fluid temperature remaining the same, when a road surface μ is at a predetermined low value, the target delivery amount takes a small value, with the drive signal set at a smaller voltage $Vm_{Low}$ and, when the road surface μ is higher, the target delivery amount takes a greater value, with the drive signal set at a greater voltage $Vm_{High}$.

12. A vehicle brake hydraulic pressure control apparatus including:
   an inlet valve interposed on a hydraulic line extending from a hydraulic pressure source to a wheel brake;

an outlet valve interposed on a hydraulic line extending from the wheel brake to a reservoir;
a pump interposed on a hydraulic line extending from the reservoir to the hydraulic pressure source;
a motor configured to drive the pump; and
a control unit configured to execute an antilock brake control, and to execute a control to return a brake fluid accumulated in the reservoir due to a pressure decreasing control in the antilock brake control to the hydraulic pressure source by driving the motor,
wherein the control unit includes:
a target delivery amount calculator configured to calculate a target delivery amount which corresponds to an amount of brake fluid discharged from the reservoir per a predetermined time;
a temperature information fetcher configured to acquire a temperature of the brake fluid; and
a drive signal determinator configured to determine a drive signal of the motor based on the target delivery amount and the temperature of the brake fluid, and
wherein the control unit includes:
a reservoir usage amount estimator configured to estimate a reservoir usage amount which corresponds to an increase amount from an initial state of the brake fluid in the reservoir; and
a target discharge time setter configured to set a target discharge time corresponding to a driving time of the motor to return the brake fluid accumulated in the reservoir to the hydraulic pressure source based on a road surface friction coefficient, and
wherein the target delivery amount calculator calculates the target delivery amount based on the reservoir usage amount and the target discharge time.

13. The vehicle brake hydraulic pressure control apparatus of claim 12,
wherein the control unit drives the motor during the pressure decreasing control, and includes:
a consumed fluid amount estimator configured to estimate a consumed fluid amount which corresponds to an amount of brake fluid which flows into the reservoir based on a hydraulic pressure at the start of the pressure decreasing control and a hydraulic pressure at the end of the pressure decreasing control; and
a delivery mount estimator configured to estimate a delivery amount which corresponds to an amount of brake fluid which is discharged from the reservoir during the pressure decreasing control, and
wherein the reservoir usage amount estimator estimates the reservoir usage amount based on the consumed fluid amount, the delivery amount and the previous value of the reservoir usage amount.

14. The vehicle brake hydraulic pressure control apparatus of claim 12,
wherein the target discharge time setter sets so that the target discharge time becomes shorter as the road surface friction coefficient becomes higher.

15. The vehicle brake hydraulic pressure control apparatus of claim 12,
wherein the target discharge time setter sets the target discharge time based on a preset second map which associates the road surface friction coefficient and the target discharge time.

* * * * *